H. H. MAPELSDEN AND C. F. BULLOCK.
FLOW TUBE.
APPLICATION FILED APR. 7, 1920.
1,419,876.
Patented June 13, 1922.
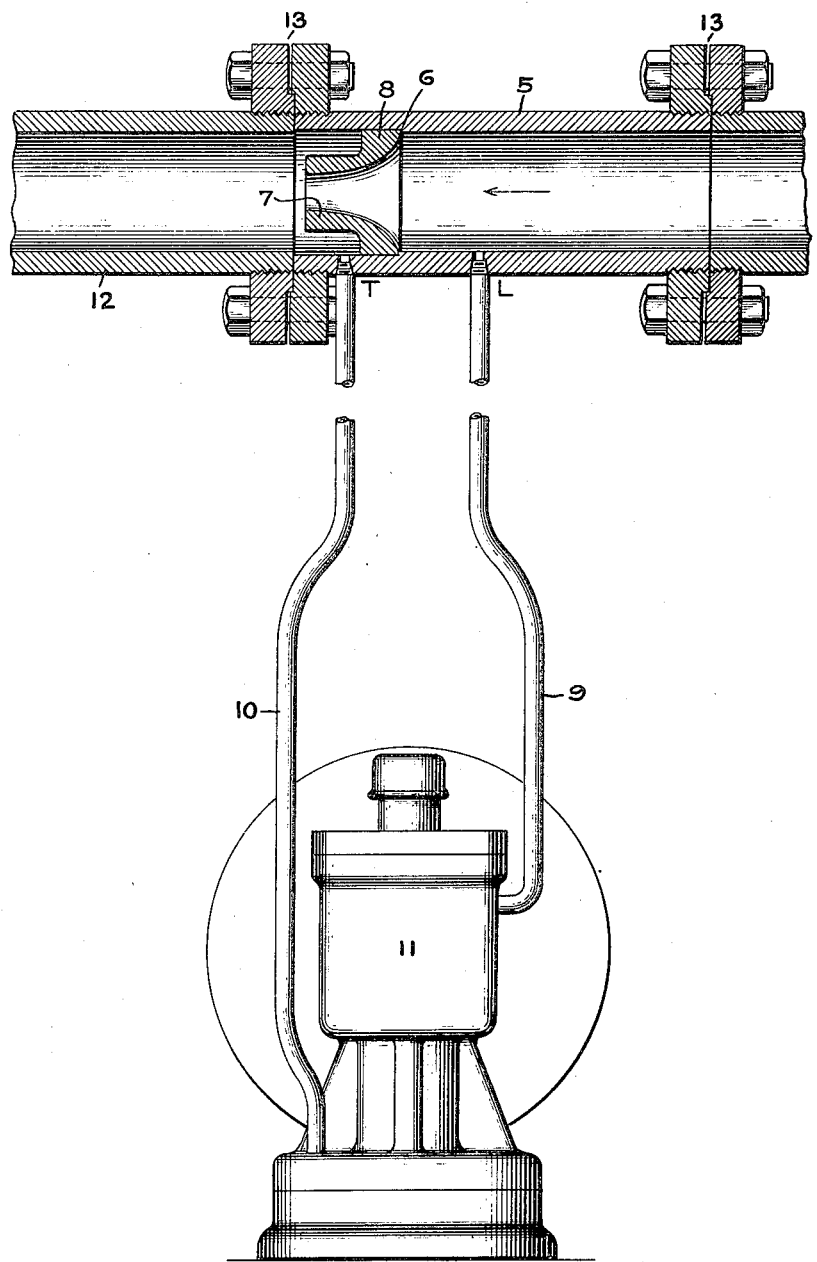
Inventors:
Harold H. Mapelsden,
Charles F. Bullock,
by Alonzo G. Davis
Their Attorney.

UNITED STATES PATENT OFFICE.

HAROLD H. MAPELSDEN AND CHARLES F. BULLOCK, OF SCHENECTADY, NEW YORK, ASSIGNORS TO GENERAL ELECTRIC COMPANY, A CORPORATION OF NEW YORK.

FLOW TUBE.

1,419,876. Specification of Letters Patent. Patented June 13, 1922.

Application filed April 7, 1920. Serial No. 371,918.

*To all whom it may concern:*

Be it known that we, HAROLD H. MAPELSDEN and CHARLES F. BULLOCK, citizens of the United States, residing at Schenectady, county of Schenectady, State of New York, have invented certain new and useful Improvements in Flow Tubes, of which the following is a specification.

The present invention relates to tubes such as are used in connection with flow meters for creating a pressure difference which bears a definite relation to the rate of flow and has for its object to provide an improved structure and arrangement in a tube of this character, which, while giving accurate results, can be cheaply built and easily installed.

For a consideration of what we believe to be novel and our invention, attention is directed to the accompanying description and the claims appended thereto.

In the drawing, the figure is a sectional view of a flow tube embodying our invention the same being shown connected to an indicating instrument.

Referring to the drawing, our flow tube comprises a tube 5 of exact internal diameter and having a shoulder 6 therein, and a nozzle 7 which is located in tube 5 and has a flange 8 which engages shoulder 6, nozzle 7 being firmly fixed in tube 5. As a preferable way of constructing such a flow tube, we take a section of tube 5 of suitable length and of the same diameter as that of the pipe line into which it is to be inserted and of which it is to form a part, and finish the inner surface to bring the tube to exact uniform internal diameter. We then counterbore the tube 5 from one end to form internal shoulder 6 and insert into the tube the nozzle 7 so its flange 8 fits against shoulder 6. The periphery of flange 8 makes a close fit with the surface of tube 5 and the nozzle is rigidly fixed therein by suitable means such as brazing for example. Nozzle 7 and tube 5 thus form a unitary structure adapted to be inserted into a pipe line or a part thereof. The direction of flow is as indicated by the arrow. The nozzle 7 points down stream, the nozzle having a flared upstream end, and, as is well understood, the nozzle serves to convert pressure into velocity, thereby setting up a pressure difference on the two sides of the nozzle which bears a definite relation to the rate of flow. The leading pressure connection is indicated at 9 and is connected to the tube 5 on the upstream side of nozzle 7. The trailing pressure connection is indicated at 10 and is connected to tube 5 on the down-stream side of flange 8 and preferably between such flange and the downstream end of nozzle 7. Connections 9 and 10 are shown in the drawing as connecting to an instrument 11 adapted to indicate or indicate and record the pressure differences set up by the flow tube.

In the drawing, the flow tube is shown as being connected into a pipe line 12, adjacent pipe ends being joined by suitable couplings as indicated at 13.

Our improved flow tube has the advantage that it can be accurately dimensioned without difficulty so it can be accurately calibrated and that it can be manufactured at a low cost. Furthermore, it is very simple, comprising but two parts, neither of which is difficult to make.

In the present instance tube 5 is shown as being counterbored from the downstream end and the nozzle inserted from such end but it will be understood of course, that the tube may be counterbored from the upstream end and the nozzle inserted from such end.

In accordance with the provisions of the patent statutes, we have described the principle of operation of our invention, together with the apparatus which we now consider to represent the best embodiment thereof, but we desire to have it understood that the apparatus shown is only illustrative and that the invention may be carried out by other means.

What we claim as new and desire to secure by Letters Patent of the United States, is—

1. A flow tube comprising a short section of straight pipe counterbored from one end to form a shoulder, and a nozzle fixed in said pipe section and pointing downstream, said nozzle having a flange which engages said shoulder to position the nozzle in the pipe section, and being positioned some distance from the up-stream end of the tube whereby a length of accurately dimensioned pipe section is provided in advance of the nozzle.

2. A flow tube comprising a short section of straight pipe counterbored from its downstream end to form an internal shoulder, and a nozzle fixed in said pipe section and projecting downstream, said nozzle having a flange which engages said shoulder to position the nozzle in the pipe section, and being positioned some distance from the up-stream end of the tube whereby a length of accurately dimensioned pipe section is provided in advance of the nozzle.

3. A flow tube comprising a short section of pipe, and a nozzle located wholly within such section, said nozzle having a flange which engages the bore of said section and is fixed thereto, and being positioned some distance from the up-stream end of the tube whereby a length of accurately dimensioned pipe section is provided in advance of the nozzle.

In witness whereof, we have hereunto set our hands this 6th day of April, 1920.

HAROLD H. MAPELSDEN.
CHARLES F. BULLOCK.